(12) United States Patent
Zhang et al.

(10) Patent No.: US 10,701,644 B2
(45) Date of Patent: Jun. 30, 2020

(54) ENHANCED MACRO DIVERSITY IN NEW RADIO (NR)

(71) Applicant: QUALCOMM Incorporated, San Diego, CA (US)

(72) Inventors: Xiaoxia Zhang, San Diego, CA (US); Siddhartha Mallik, San Diego, CA (US); Taesang Yoo, Riverside, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 15/615,451

(22) Filed: Jun. 6, 2017

(65) Prior Publication Data

US 2018/0352520 A1     Dec. 6, 2018

(51) Int. Cl.
| | | |
|---|---|---|
| *H04W 56/00* | (2009.01) | |
| *H04W 52/40* | (2009.01) | |
| *H04W 52/42* | (2009.01) | |
| *H04B 7/06* | (2006.01) | |
| *H04B 7/022* | (2017.01) | |
| *H04W 72/12* | (2009.01) | |

(52) U.S. Cl.
CPC ............ *H04W 52/40* (2013.01); *H04B 7/022* (2013.01); *H04B 7/0695* (2013.01); *H04W 52/42* (2013.01); *H04W 72/1273* (2013.01)

(58) Field of Classification Search
CPC ..... H04W 52/40; H04W 36/12; H04W 36/22; H04W 52/244; H04W 52/265; H04W 52/42
USPC ......................................................... 370/329
See application file for complete search history.

(56) References Cited

U.S. PATENT DOCUMENTS

| | | | | |
|---|---|---|---|---|
| 7,684,820 B2* | 3/2010 | McGuffin | ........... | H04B 7/18506 455/431 |
| 2010/0075704 A1* | 3/2010 | McHenry | .............. | H04W 16/14 455/509 |
| 2010/0159845 A1* | 6/2010 | Kaaja | ..................... | H04B 7/088 455/70 |
| 2015/0312793 A1* | 10/2015 | Jeon | .................. | H04W 28/0205 370/329 |
| 2017/0237463 A1* | 8/2017 | Zheng | ................... | H04W 56/00 370/328 |
| 2017/0257850 A1* | 9/2017 | Oh | ....................... | H04W 72/042 |

* cited by examiner

*Primary Examiner* — Sai Ming Chan
(74) *Attorney, Agent, or Firm* — Haynes and Boone, LLP

(57) ABSTRACT

Wireless communications systems and methods related to improving macro diversity are provided. A first wireless communication device communicates, in a frequency channel, a first signal with a user equipment (UE) during a first time period. The first wireless communication device coordinates, with a second wireless communication device, a communication of a second signal with the UE in the frequency channel during a second time period. The coordination with the second wireless communication device is based on a switch to coordinate with the second wireless communication device based on at least occupancy of the frequency channel. The second wireless communication device communicates, in the frequency channel, the second signal with the UE during the second time period based on the coordination. The first wireless communication device and the second wireless communication device are different. The first time period and the second time period are different.

28 Claims, 12 Drawing Sheets

ENHANCED MACRO DIVERSITY IN NEW RADIO (NR)

TECHNICAL FIELD

This application relates to wireless communication systems and methods, and more particularly to improving macro diversity in new radio (NR) communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies or radio access technologies (RATs) are advancing from the LTE technology to a next generation new radio (NR) technology. For example, NR is designed to provide a lower latency, a higher bandwidth or throughput, and a higher reliability than LTE. To provide the higher bandwidth or throughput, NR extends communications into millimeter wave (mmWave) bands and provisions for dynamic medium sharing among network operators and different RATs in a licensed spectrum, a shared spectrum, and/or an unlicensed spectrum.

In homogenous wireless communication network deployments, an operator may deploy BSs in a number of cells and a UE operated by the operator is served by a BS or a cell of the operator with the strongest signal strength. However, dynamic medium sharing can cause a BS to reduce its transmission power during some time periods based on channel sensing. Thus, a serving BS or serving cell may not be the strongest BS or the strongest cell for a UE at all time. Instead, a neighboring BS or a neighboring cell may provide a better channel (e.g., with a higher signal-to-noise ratio (SNR)) to the UE than the serving BS or the serving cell during certain time periods. Similarly, the use of directional beams for communications in the mmWave bands can cause a serving BS unable to serve a UE with a best directional beam in some time periods due to directional listen-before-talk (LBT) or the serving BS is busy serving another UE in another beam direction. For example, a neighboring BS may serve the UE using a better directional beam than the serving BS during certain time periods. Accordingly, improving coordination among BSs and considering dynamic sharing and directional beam usages in BS coordination can increase network performance.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a user equipment (UE) in a frequency channel, a first signal with a first wireless communication device during a first time period; and communicating, by the UE in the frequency channel, a second signal with a second wireless communication device during a second time period, wherein the communicating the second signal with the second wireless communication device is based on a switch to communicate with the second wireless communication device based on at least an occupancy of the frequency channel, wherein the first wireless communication device and the second wireless communication device are different, and wherein the first time period and the second time period are different.

In an additional aspect of the disclosure, a method of wireless communication includes communicating, by a first wireless communication device in a frequency channel, a first signal with a user equipment (UE) during a first time period; and coordinating, by the first wireless communication device with a second wireless communication device, a communication of a second signal with the UE in the frequency channel during a second time period, wherein the coordinating with the second wireless communication device is based on a switch to coordinate with the second wireless communication device based on at least an occupancy of the frequency channel, wherein the first wireless communication device and the second wireless communication device are different, and wherein the first time period and the second time period are different.

In an additional aspect of the disclosure, an apparatus includes a transceiver configured to communicate, in a frequency channel, a first signal with a first wireless communication device during a first time period; and communicate, in the frequency channel, a second signal with a second wireless communication device during a second time period, wherein the communication of the second signal with the second wireless communication device is based on a switch to communicate with the second wireless communication device based on at least an occupancy of the frequency channel, wherein the first wireless communication device and the second wireless communication device are different, and wherein the first time period and the second time period are different.

In an additional aspect of the disclosure, an apparatus comprising a transceiver configured to communicate, in a frequency channel, a first signal with a user equipment (UE) during a first time period; and a processor configured to coordinate, with a second wireless communication device, a communication of a second signal with the UE in the frequency channel during a second time period, wherein the coordination with second wireless communication device is based on a switch to coordinate with the second wireless communication device based on at least an occupancy of the frequency channel, wherein the apparatus and the second wireless communication device are different, and wherein the first time period and the second time period are different.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
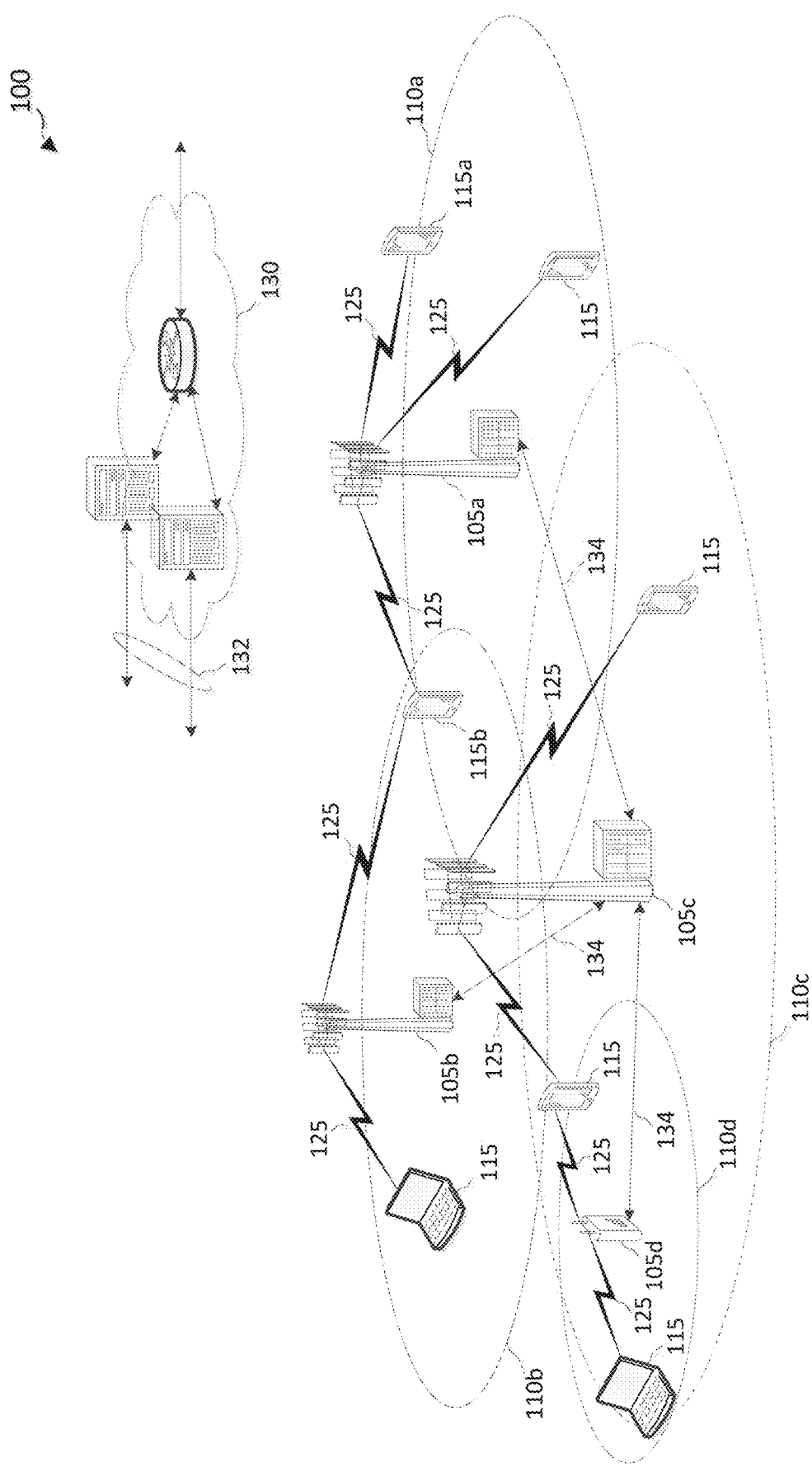
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present application describes mechanisms for improving macro diversity in NR by dynamically switching communications with a UE among multiple BSs. For example, a UE may associate with a set of BSs in a network. The BSs may be located in different geographical locations (e.g., in adjacent areas). The BSs may use the same frequency channel to communicate with the UE. The set of BSs may include at least one serving BS and one or more alternate BSs. The serving BS may be an anchoring BS that can provide the best channel quality to the UE among the set of BSs. An alternate BS may serve the UE when the serving BS is unable to communicate with the UE or when the alternate BS can better serve (e.g., to provide a higher throughput) the UE than the serving BS, for example, due to occupancy of the frequency channel. Thus, the communications with the UE may be dynamically switched among the BSs in the set, where the UE may communicate with one BS at any given time.

The switching may be controlled by the BSs and/or the UE. The switching may consider dynamic medium sharing, directional beam transmissions, and/or scheduling or prioritization of transmission link directions. In an embodiment of dynamic sharing, when the serving BS performs LBT and detects a reservation from another BS or UE in the area of the serving BS, the serving BS can coordinate with another BS in the set to switch communication with the UE to the other BS. In an embodiment of directional beam transmissions, when the serving BS cannot serve the UE with an optimal directional beam, for example, due to a scheduling conflict or directional LBT, the serving BS can coordinate with another BS in the set to switch communication with the UE to the other BS. In another embodiment, the serving BS may provide the UE with multiple transmission configurations to communicate UL signals with the BSs in the set. The UE may perform LBT and select a BS from the set and a transmission configuration based on LBT. In another embodiment, the UE may perform LBT, select a target receiving BS from the set, determine a transmission configuration, and request the target receiving BS to monitor for a UL reception from the UE.

Aspects of the present application can provide several benefits. For example, the dynamic switching of communications with a UE among different BSs allows the UE to communicate over a best UL channel or a best DL channel in a network at any given time. The disclosed embodiments can take advantages of dynamic medium sharing and/or directional beam transmissions without limiting performance at certain time periods. The dynamic switching can occur at a substantially fast rate, for example, up to a switch per transmission frame or transmission time interval (TTI). Thus, the disclosed embodiments can improve network throughput or data rate. The disclosed embodiments are suitable for use in any wireless communication network with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

In an embodiment, the network 100 may operate over a shared channel, which may include a licensed spectrum, a shared spectrum, and/or an unlicensed spectrum, and may support dynamic medium sharing. The BSs 105 and the UEs 115 may communicate with each other based on listen-before-talk (LBT) to ensure that the channel is clear before transmitting a signal in the channel. For example, the BS 105 or the UE 115 may yield access to the channel when the channel is busy. In some embodiments, a shared channel can be time-partitioned into transmission opportunities (TXOPs) and access to the channel may be based on reservations and access priorities. For example, a particular BS 105 and/or a particular UE 115 may have priority over other BSs 105 and UEs 115 for accessing the channel in a particular TXOP. Other BSs 105 and other UEs 115 may monitor the channel for a reservation from the particular BS 105 and/or the particular UE 115. Upon detecting a reservation from the particular BS 105 and/or the particular UE, the other BSs 105 and UEs 115 may refrain from transmitting in the channel during the particular TXOP.

In an embodiment, the network 100 may operate over a mmWave band. The BSs 105 and the UEs 115 may communicate with each other using directional beams due to high path loss in the mmWave band. For example, a BS 105 and a UE 115 may determine a best beam direction for communicating with each other during an initial network access procedure and subsequently communicate with each other using directional beams in the best beam direction. In some embodiments, the BSs 105 and the UEs 115 may perform directional LBT in the network 100 for dynamic medium sharing. For example, when a particular BS 105 is serving a UE 115 in a particular beam direction, other BSs 105 and other UEs 115 may refrain from transmitting in the particular beam direction. In some embodiments, the BSs 105 may coordinate with each other to serve the UEs 115 by considering transmit yielding in dynamic medium sharing, dynamic TDD, and/or directional beam usages, as described in greater detail herein.

Figure 2:
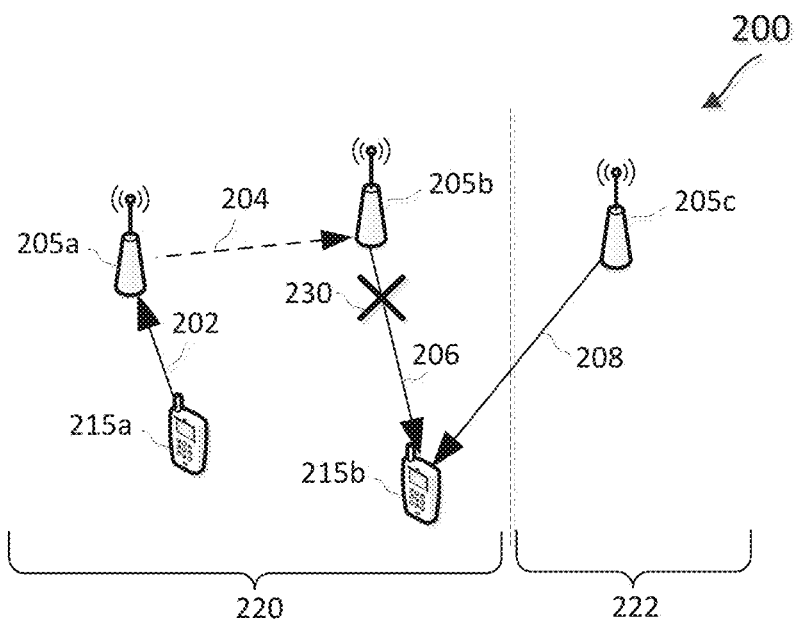
FIG. 2 illustrates a dynamic medium sharing scenario in a wireless communication network according to embodiments of the present disclosure.

FIG. 2 illustrates a dynamic medium sharing scenario 200 in a wireless communication network such as the network 100 according to embodiments of the present disclosure. FIG. 2 illustrates three BSs 205 and two UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The BS 205a, BS 205b, the UE 215a, and the UE 215b are located in an area 220. The BS 205c is located in an area 222 adjacent to the area 220. The BS 205a may have a best DL path loss to the UE 215a among the BSs 205. Thus, the BS 205a may serve the UE 215a. Similarly, the BS 205b may have a best DL path loss to the UE 215b among the BSs 205. Thus, the BS 205b may serve the UE 215b. The BS 205a may be referred to as a serving BS to the UE 215a. The BS 205b may be referred to as a serving BS to the UE 215b.

In the scenario 200, the BSs 205 may communicate with the UEs 215 over a frequency channel using a prioritized reservation-based dynamic medium sharing scheme. For example, in a particular time period, the BS 205a and the UE 215a have prioritized access to the frequency channel in a UL direction, while the BSs 205b and 205c and the UE 215b can opportunistically access the frequency channel when the frequency channel is not occupied by the BS 205a or the UE 215a.

As shown, the BS 205a schedules the UE 215a for a UL communication 202 during the particular time period and transmits a reservation signal 204. The reservation signal 204 may indicate a reservation for the particular time period.

The low-priority BS 205b may perform channel sensing to monitor the frequency channel for a reservation. Upon detecting the reservation signal 204 from the BS 205a, the BS 205b may yield channel access to the BS 205a and refrain from communicating a DL communication 206 with the UE 215b in the particular time period as shown by the cross 230. Similarly, the BS 205c may monitor the frequency channel for a reservation. However, the BS 205c is positioned farther away from the BS 205a than the BS 205b. Thus, the BS 205c may not detect the reservation signal 204 from the BS 205a. Therefore, while the neighboring BS 205c may not provide the best DL path loss to the UE 215b, the BS 205c can transmit a DL communication 208 to the UE 215b during the particular time period.

Alternatively, the BS 205b may determine to proceed with the DL communication 206, but may be required to reduce the transmission power for the DL communication 206. For example, the BS 205b may reduce the transmission power such that the DL communication 206 may generate a minimal amount of interference or no interference to the BS 205a or the UL communication 202. Since the BS 205c is not required to yield or reduce the transmission power for the DL communication 208, the BS 205c may provide a better signal quality or data rate to the UE 215b than the serving BS 205b during the particular time period. As an example, the DL path loss from the BS 205c to the UE 215b is about 10 decibels (dB) higher than from the BS 205b to the UE 215b. However, the UE 215b is required to reduce the transmission power level by about 13 dB during the particular time period. Thus, the BS 205c can provide a better signal strength (e.g., by about 3 dB) than the BS 205b during the particular time period.

As can be seen in the scenario 200, network performance or data rate can be improved by allowing an alternate BS or a neighboring BS (e.g., the BS 205c) to serve a UE (e.g., the UE 215b) when a serving BS (e.g., the BS 205b) is unable to serve the UE or is required to use a reduced transmission power due to transmit yielding.

Figure 3:
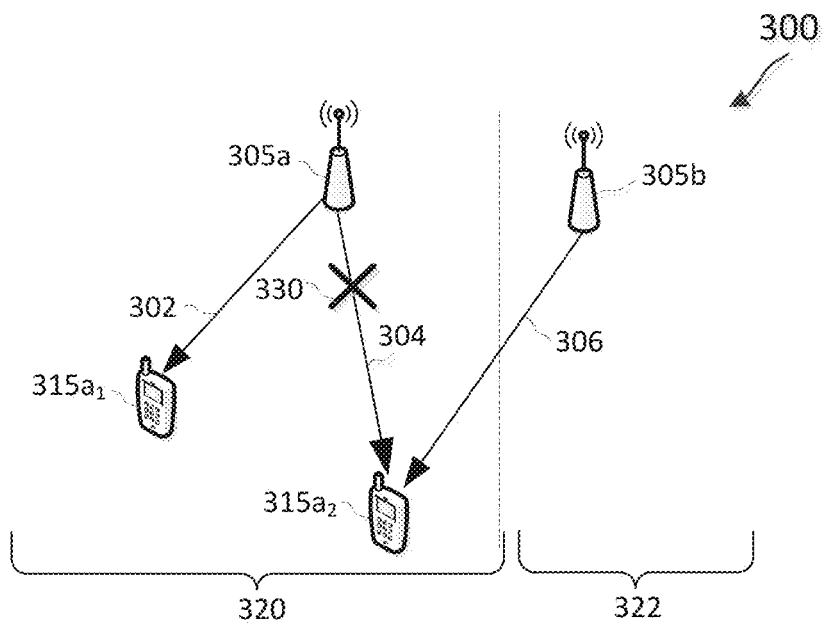
FIG. 3 illustrates a directional listen-before-talk (LBT) scenario in a wireless communication network according to embodiments of the present disclosure.

FIG. 3 illustrates a directional LBT scenario 300 in a wireless communication network such as the network 100 according to embodiments of the present disclosure. FIG. 3 illustrates two BSs 305 and two UEs 315 for purposes of simplicity of discussion, though it will be recognized that embodiments of the present disclosure may scale to many more UEs 315 and/or BSs 305. The BSs 305 may be similar to the BSs 105 and 205. The UEs 315 may be similar to the UEs 115 and 215. The BS 305a, UE 315a$_1$, and the UE 315a$_2$ are located in an area 320. The BS 305b is located in an area 322 adjacent to the area 320. The BS 305a may have a best DL path loss to the UEs 315a$_1$ and 315a$_2$ among the BSs 305. Thus, the BS 305a may serve the UEs 315a$_1$ and 315a$_2$.

In the scenario 300, the network may operate over a mmWave band. Thus, the BSs 305 may communicate with the UEs 315 using directional beams. For example, the BS 305a may serve the UE 315a$_1$ and 315a$_2$ using directional beams 302 and 304, respectively. As shown, the directional beam 302 is directing towards a direction of the UE 315a$_1$. Similarly, the directional beam 304 is directing towards a direction of the UE 315a$_2$.

In an embodiment, the beams 302 and 304 may be analog beams. Thus, the BS 305a can transmit the beam 302 or the beam 304, but may not simultaneously transmit the beams 302 and 304. For example, in a particular time period, the BS 305a may be busy serving the UE 315a$_1$, and thus may be unable to serve the beam 304 to the UE 315a$_2$ as shown by the cross 330. However, while the neighboring BS 305b may not provide the best DL path loss to the UE 315a$_2$, the BS 305b can serve a directional beam 306 directing to the UE 315a$_2$ in the particular time period.

In another embodiment, the BS 305a may perform directional LBT. Directional LBT refers to the monitoring of a channel for reservations in particular beam directions. For example, the BS 305a may detect a reservation for a particular time period from another BS (e.g., similar to the BS 305) or another UE (e.g., similar to the UE 315) for a transmission in a beam direction towards the UE 315a$_2$. Thus, the BS 305a may not serve the directional beam 304 to the UE 315a$_2$ during the particular time period. Similar to the scenario 200, since the BS 305b is located in a different area 322 than the BS 305a, the BS 305b may not detect the reservation or may determine that a transmission of a directional beam 306 towards the UE 315a$_2$ during the particular time period may not cause any significant interference to the other BS and/or the other UE. Thus, while the neighboring BS 305b may not provide the best DL path loss to the UE 315a$_2$, the BS 305b can serve the directional beam 306 to the UE 315a$_2$ in the particular time period.

As can be seen in the scenario 300, network performance or data rate can be improved by allowing an alternate BS or a neighboring BS (e.g., the BS 305b) to serve a UE (e.g., the UE 315a$_2$) when a serving BS (e.g., the BS 305a) is unable to serve the UE due to directional LBT and/or scheduling conflict.

Figure 4:
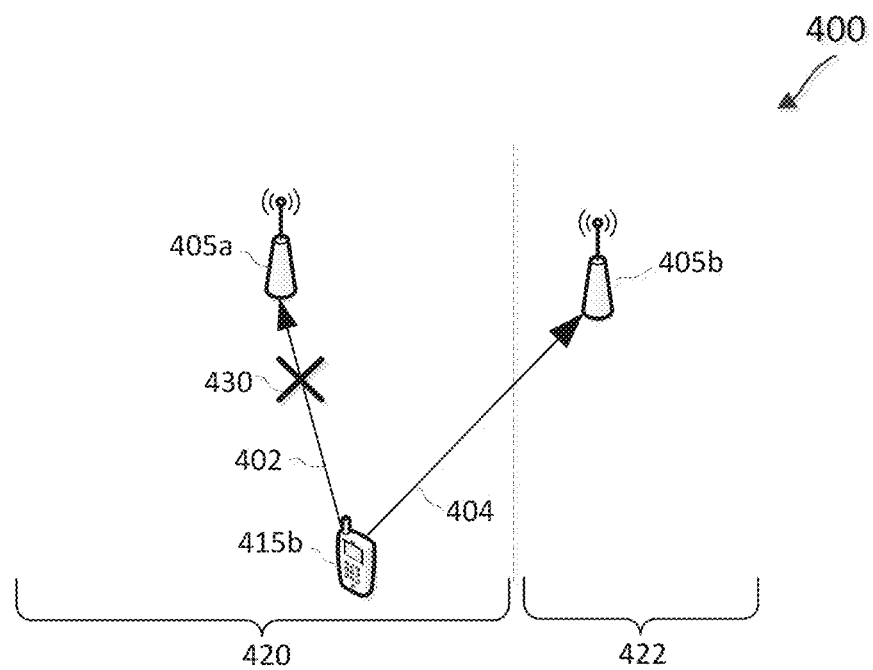
FIG. 4 illustrates a directional LBT scenario according to embodiments of the present disclosure.

FIG. 4 illustrates a directional LBT scenario 400 in a wireless communication network such as the network 100 according to embodiments of the present disclosure. FIG. 4 illustrates two BSs 405 and one UE 415 for purposes of simplicity of discussion, though it will be recognized that embodiments of the present disclosure may scale to many more UE 415 and/or BSs 405. The BSs 405 may be similar to the BSs 105, 205, and 305. The UE 415 may be similar to the UEs 115, 215, and 315. The BS 405a and the UE 415 are located in an area 420. The BS 405b is located in an area 422 adjacent to the area 420. The BS 405a may have a best DL path loss to the UE 415 among the BSs 405. Thus, the BS 405a may serve the UE 415.

Similar to the scenario 300, the network may operate over a mmWave band in the scenario 300. For example, the UE 415 may communicate with the BS 405a using a directional beam 402. As shown, the directional beam 402 is directing towards a direction of the BS 405a.

In an embodiment, the UE 415 may perform directional LBT. For example, the UE 415 may detect a reservation for a particular time period from another BS (e.g., similar to the BS 405) or another UE (e.g., similar to the UE 415) for a transmission in a beam direction towards the BS 405a. Thus, the UE 415 may not transmit a directional beam 402 to the BS 405a during the particular time period as shown by the cross 430. However, the BS 405b is located in a different area 422 than the BS 405a, and thus the UE 415 may determine that a transmission of a directional beam 404 towards the BS 405b during the particular time period may not cause any significant interference to the other BS and/or the other UE. Thus, while the neighboring BS 405b may not provide the best DL path loss to the UE 415, the BS 405b can receive the directional beam 404 from the UE 415 and serve the UE 415 in the particular time period.

In another embodiment, the BS 405a may be busy serving another UE (e.g., similar to the UE 415) in a DL direction during a particular time period, and thus may be unable to serve the UE 415 in the UL direction during the particular time period. However, the BS 405b may be available for serving the UE 415 in a UL direction during the particular time period.

In another embodiment, the BS 405a may have scheduled a UL communication with another UE located in a different direction (e.g., requiring a different beam direction) than the UE 415 during a particular time period, and thus may be unable to serve the UE 415 during the particular period. However, the BS 405b may be available for serving the UE 415 in a UL direction during the particular time period.

As can be seen in the scenario 400, network performance or data rate can be improved by allowing an alternate BS or a neighboring BS (e.g., the BS 205c) to serve a UE (e.g., the UE 215b) when a serving BS (e.g., the BS 205b) is unable to serve the UE due to directional LBT, scheduling conflict, and/or dynamic TDD.

Figure 5:
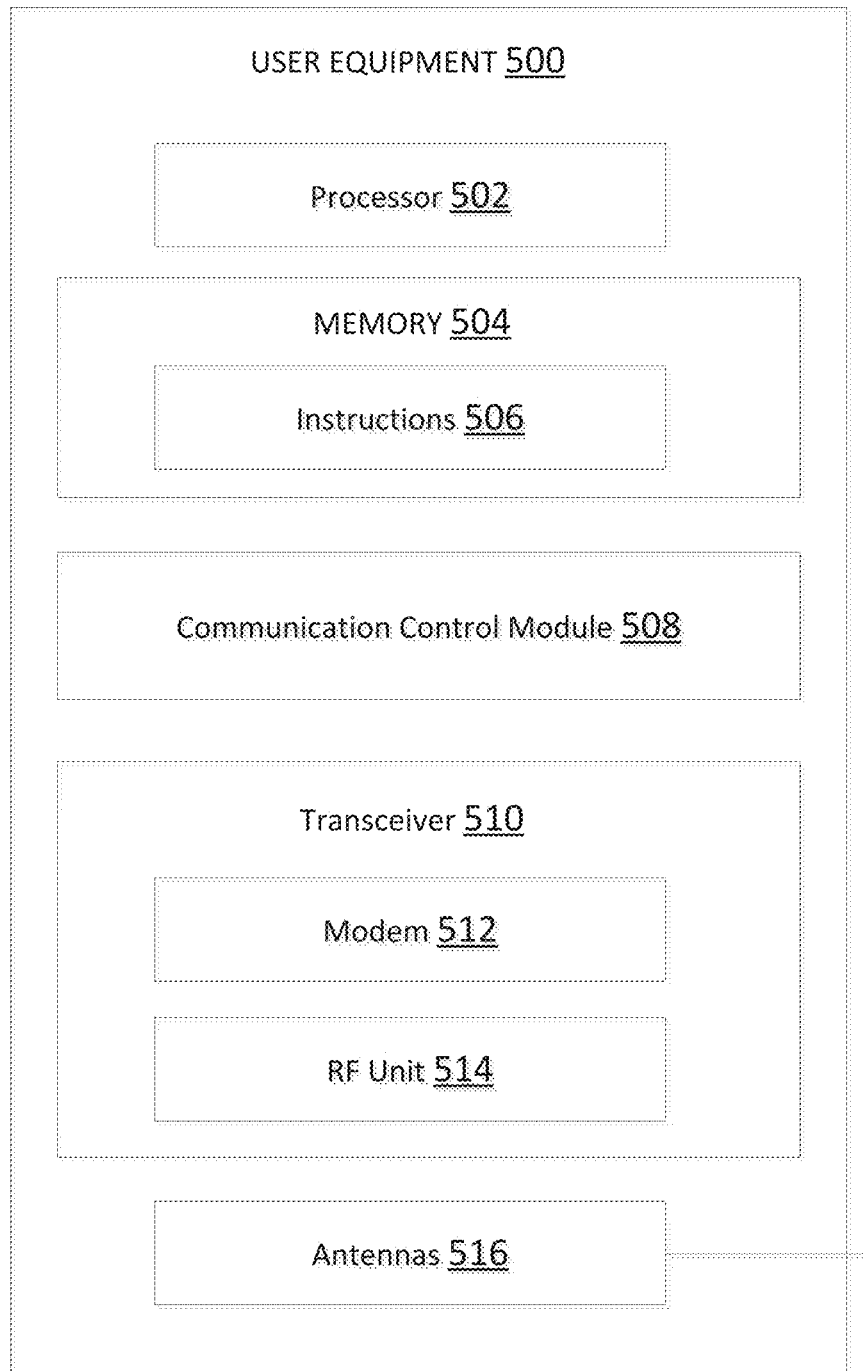
FIG. 5 is a block diagram of an exemplary user equipment (UE) according to embodiments of the present disclosure.

FIG. 5 is a block diagram of an exemplary UE 500 according to embodiments of the present disclosure. The UE 500 may be a UE 115, 215, 315, or 415 as discussed above. As shown, the UE 500 may include a processor 502, a memory 504, a communication control module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 215 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication control module 508 may be used for various aspects of the present disclosure. For example, the communication control module 508 is configured to monitor for grants from a BS (e.g., the BSs 105, 205, 305, and 405), perform LBT, perform direction LBT, transmit scheduling requests (SRs) based on LBT and/or directional LBT, and/or dynamically switching to communicate with different BSs within an associated set of BSs on received grants, LBT, and/or directional LBT. Mechanisms for dynamically switching communications with different BSs are described in greater detail herein.

As shown, the transceiver 510 may include the modem subsystem 512 and the RF unit 514. The transceiver 510 can be configured to communicate bi-directionally with other devices, such as the BSs 105 and 205. The modem subsystem 512 may be configured to modulate and/or encode the data from the memory 504, and/or the communication control module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115, 215, 315, or 415 or a BS 105, 205, 305, or 405. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 215 to enable the UE 215 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of UL data, UL controls, and/or SRs according to embodiments of the present disclosure. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516.

Figure 6:
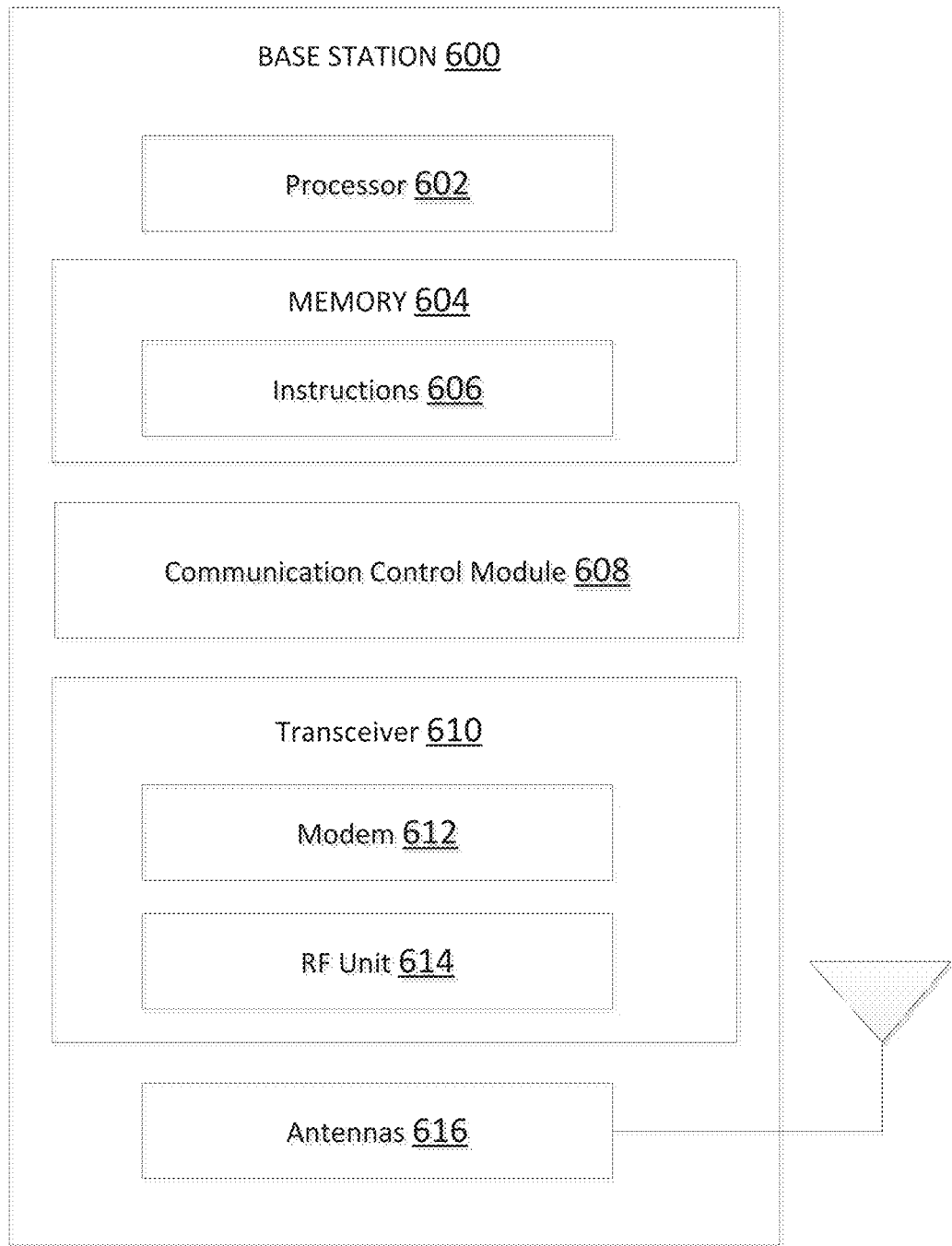
FIG. 6 is a block diagram of an exemplary base station (BS) according to embodiments of the present disclosure.

FIG. 6 is a block diagram of an exemplary BS 600 according to embodiments of the present disclosure. The BS 600 may be a BS 105, 205, 305, or 405 as discussed above. A shown, the BS 600 may include a processor 602, a memory 604, a communication control module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 6.

The communication control module 608 may be used for various aspects of the present disclosure. For example, the communication control module 608 is configured perform LBT, perform directional LBT, determine grants based on the LBT and/or the directional LBT, monitor for SRs from UEs (e.g., the UEs 115, 215, 315, and 415), and/or dynamically switching coordination with different BSs among a set of BSs associated with a UE for communications based on the LBT, the directional LBT, the grants, and/or the SRs. Mechanisms for dynamically switching coordination with different BSs are described in greater detail herein.

As shown, the transceiver 610 may include the modem subsystem 612 and the RF unit 614. The transceiver 610 can be configured to communicate bi-directionally with other devices, such as the UEs 115 and 215 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115, 215, or 500. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 105, or 205 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115, 215, or 500 according to embodiments of the present disclosure. The antennas 616 may further receive data messages transmitted from other devices and provide the received data messages for processing and/or demodulation at the transceiver 610. The antennas 616 may include multiple antennas of similar or different designs in order to sustain multiple transmission links.

FIGS. 7-13 illustrate various mechanisms for improving macro-diversity by dynamically switching communications with a UE (e.g., the UEs 115, 215, 315, 415, and 500) among different BSs (e.g., the BSs 105, 205, 305, 405, and 600) in a network (e.g., the network 100). FIGS. 7-13 illustrate the mechanisms using one UE and two BSs for purposes of simplicity of discussion, though it will be recognized that embodiments of the present disclosure may scale to many more UEs and/or BSs. As an example, a UE may associate with a set of BSs including a serving BS A and an alternate BS B for communications. The serving BS A and the alternate BS B may communicate with the UE over the same frequency channel (e.g., a channel in a frequency band). The serving BS A may provide the best DL path loss to the UE. The alternate BS B may serve the UE when the serving BS A is unable to serve the UE, for example, due to transmit yielding, directional LBT, or a scheduling conflict as described above in the scenarios 200, 300, and 400 with respect to FIGS. 2, 3, and 4, respectively.

The set of BSs may be referred to as an active set. While FIGS. 7-13 illustrate a serving BS and one alternate BS in the active set, a set may include any suitable number of alternate BSs, for example, about two, three, or four alternate BSs. In some embodiments, an active set may be limited to a predetermined maximum number of BSs and the BSs may be selected based on a path loss to a UE (e.g., limited by a path loss threshold). In an embodiment, the BSs may represent the BSs 205$b$ and 205$c$ and the UE may represent the UE 215$b$ in the scenario 200. In another embodiment, the BSs may represent the BSs 305$a$ and 305$b$, and the UE may represent the UE 315$a_2$ in the scenario 300. In another embodiment, the BSs may represent the BSs 405$a$ and 405$b$, and the UE may represent the UE 415 in the scenario 400.

Figure 7:
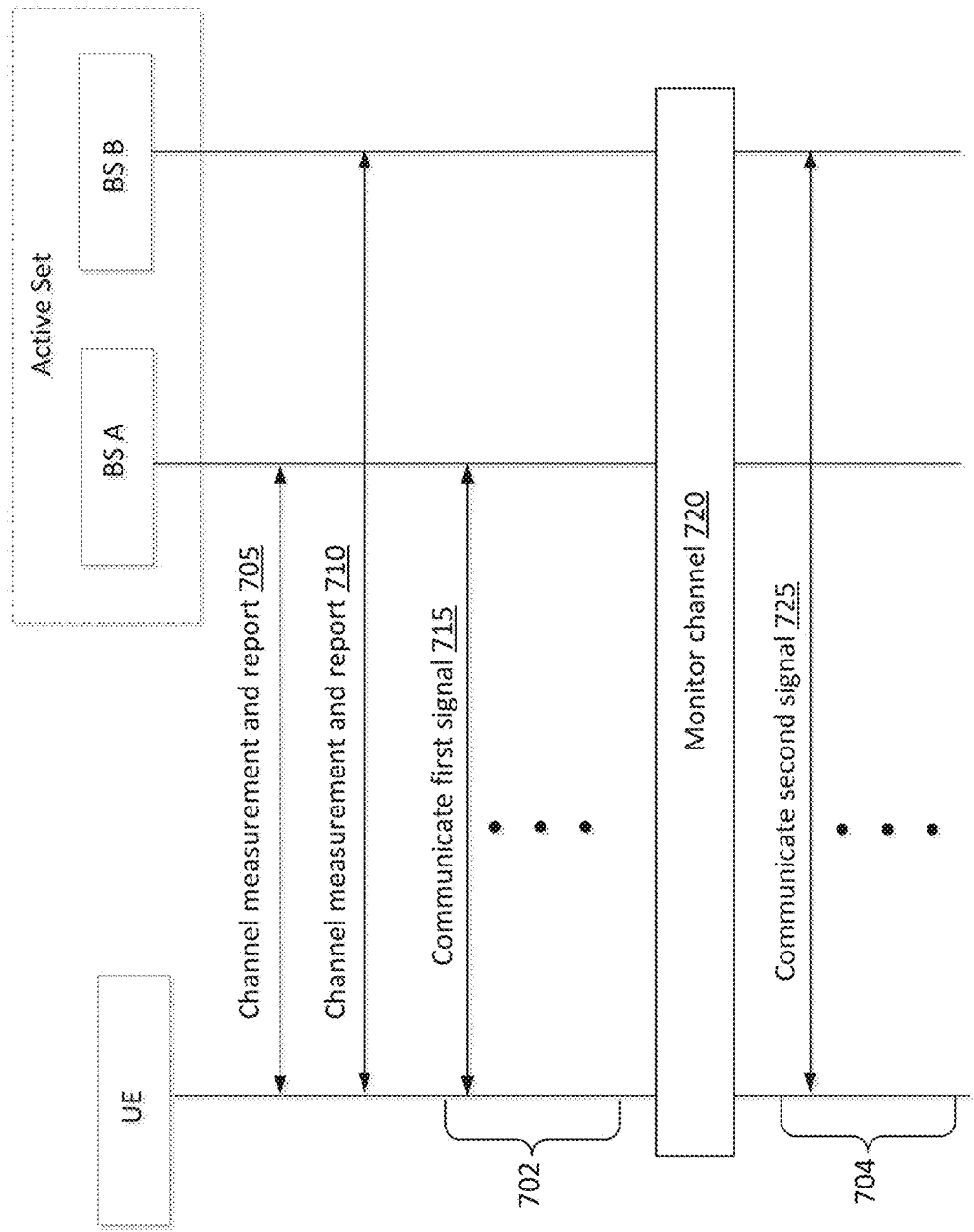
FIG. 7 is a signaling diagram illustrating a communication method according to embodiments of the present disclosure.

FIG. 7 is a signaling diagram illustrating a communication method 700 according to embodiments of the present disclosure. Steps of the method 700 can be executed by computing devices (e.g., a processor, processing circuit, and/or other suitable component) of wireless communication devices, such as the BSs 105, 205, 305, 405, and 600 and the UEs 115, 215, 315, 415, and 500. The method 700 can be better understood with reference to FIGS. 2, 3, and 4. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 705, the UE performs channel measurements and reporting over the frequency channel with the serving BS A. For example, the serving BS A may transmit reference signals, such as CSI-RSs, to facilitate DL channel measurements. The UE may transmit reference signals, such as SRSs, to facilitate UL channel measurements. A reference signals may include a predetermined sequence. The UE may report DL channel measurements to the serving BS. Examples of DL channel measurements may include channel quality indicator (CQIs), receive signal strength indicators (RSSIs), and/or reference signal received powers (RSRPs). In an embodiment, the UE and the serving BS A may determine a best beam direction for communicating with each other based on the measurements and reports.

At step 710, the UE performs channel measurements and reporting with a BS B over the frequency channel, for example, using similar mechanisms as described in the step 705. The UE may perform the channel measurements and reporting with the BS A and the BS B during initial cell acquisition and subsequently during a normal operational mode.

At step 715, during a first time period 702, the serving BS A may serve the UE by communicating a first signal with the UE. The first signal may include data and/or control information. The first signal may be in a DL direction or a UL direction.

At step 720, the serving BS A, the alternate BS B, and/or the UE may monitor the frequency channel According to embodiments of the present disclosure, the serving BS A, the alternate BS B, and/or the UE may coordinate to dynamically switch communications between the UE and the serving BS A to the alternate BS B based on the monitoring. The monitoring may include performing LBT, directional LBT, and/or scheduling. The switching may be caused by an expected occupancy or an expected transmission in the frequency channel, for example, based on a reservation or a scheduled transmission as described above in the scenarios 200, 300, and 400 with respect to FIGS. 2, 3, and 4, respectively. Mechanisms for dynamically switching the communications between a serving BS and an alternate BS are described in greater detail herein.

At step 725, during a second time period 704, the alternate BS B may serve the UE by communicating a second signal with the UE. The second signal may include data and/or control information. The second signal may be in a DL direction or a UL direction.

The communications with the UE may switch back and forth between the serving BS A and the alternate BS B based on channel monitoring. As described above, the switching may be based on occupancy of the frequency channel instead of a channel quality (e.g., receive signal strength indicator (RSSI)) of the frequency channel as in handover. Handover occurs semi-statically, for example, when a UE travels from one cell (e.g., the areas 110) to another cell. The switching can occur at a substantially faster rate than the semi-static handover. For example, the time periods 702 and 704 may be on the order of milliseconds instead of seconds or minutes as in semi-static handover. Since the switching is initiated based on channel occupancy, the switching may occur with or without a mobility action (e.g., movement) from the UE.

Figure 8:
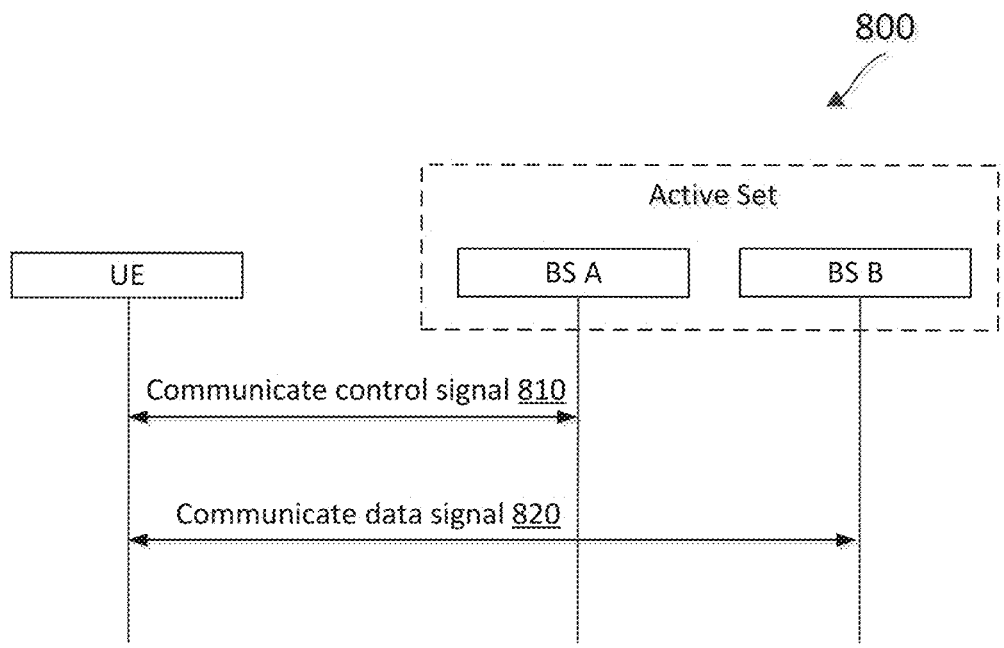
FIG. 8 is a signaling diagram illustrating a communication method according to embodiments of the present disclosure.

FIG. 8 is a signaling diagram illustrating a communication method 800 according to embodiments of the present disclosure. The method 800 illustrates associating control signal transmissions with one BS within an active set and associating data signal transmissions with another BS within the active set. Steps of the method 800 can be executed by computing devices (e.g., a processor, processing circuit, and/or other suitable component) of wireless communication devices, such as the BSs 105, 205, 305, 405, and 600 and the UEs 115, 215, 315, 415, and 500. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the UE communicates a control signal with the serving BS A. The control signal may carry control information. The control information may include scheduling information, such as transmission grants or SRs. At step 820, the UE communicates a data signal with the alternate BS B. The data signal may carry data.

In an embodiment, control signals may be transmitted using a more robust transmission configuration (e.g., including a lower modulation order or a higher code rate) than data signals. For example, the control signal may be communicated during a time period where the serving BS A is required to reduce a transmission power (e.g., due to transmit yielding). Alternatively, the control signal may be communicated during a particular time period where the serving BS A can only serve the UE using a misaligned beam not directing towards the UE (e.g., due to serving another UE). The robust transmission configuration allows the UE to correctly decode the control signal transmitted at a reduced transmission power or transmitted using a misaligned beam.

Figure 9:
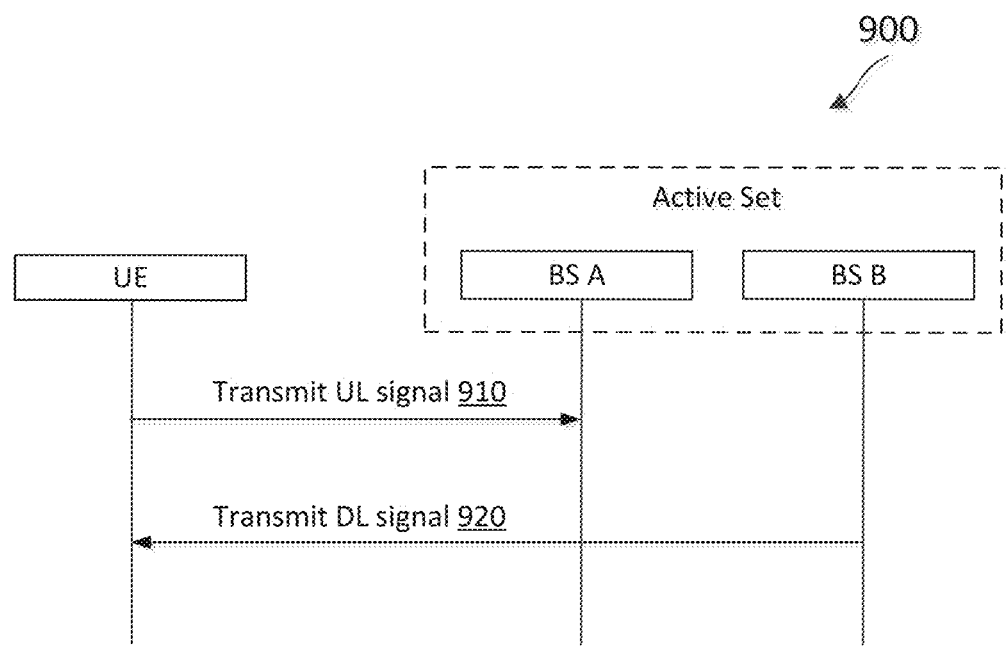
FIG. 9 is a signaling diagram illustrating a communication method according to embodiments of the present disclosure.

FIG. 9 is a signaling diagram illustrating a communication method 900 according to embodiments of the present disclosure. The method 900 illustrates associating UL transmissions with one BS within an active set and associating DL transmissions with another BS within the active set. Steps of the method 900 can be executed by computing devices (e.g., a processor, processing circuit, and/or other suitable component) of wireless communication devices, such as the BSs 105, 205, 305, 405, and 600 and the UEs 115, 215, 315, 415, and 500. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the UE transmits a UL signal to the serving BS A. At step 920, the alternate BS B transmits a DL signal to the UE. While the method 900 illustrates associating UL transmissions with the serving BS A and associating DL transmissions with the alternate BS B, the method 900 may be applied associated UL transmissions with the alternate BS B and associating DL transmissions with the serving BS A.

Figure 10:
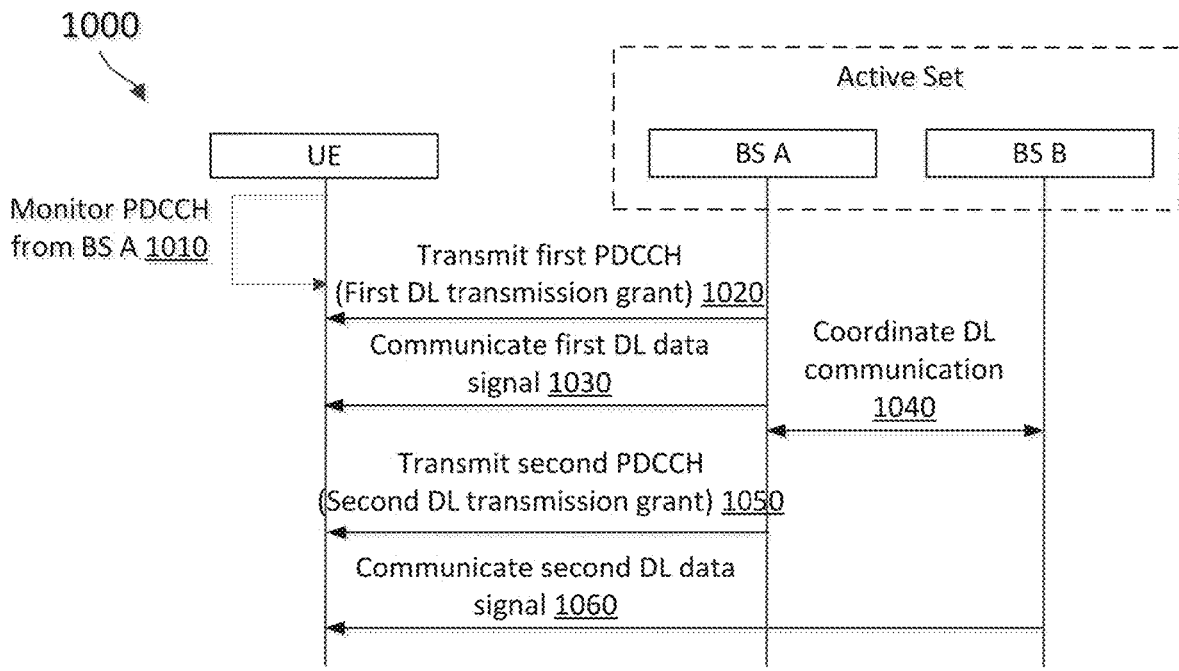
FIG. 10 is a signaling diagram illustrating a downlink (DL) communication method according to embodiments of the present disclosure.

FIG. 10 is a signaling diagram illustrating a DL communication method 1000 according to embodiments of the present disclosure. The method 1000 illustrates a serving BS transmitting DL transmission grants for DL communications with the serving BS or other BSs in an active set. Steps of the method 1000 can be executed by computing devices (e.g., a processor, processing circuit, and/or other suitable component) of wireless communication devices, such as the BSs 105, 205, 305, 405, and 600 and the UEs 115, 215, 315, 415, and 500. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the UE monitors for a physical downlink control channel (PDCCH) signal from the serving BS A. The PDCCH signal may carry scheduling information or transmission grants for the UE.

At step 1020, the serving BS A transmits a first PDCCH signal carrying a first DL transmission grant for the UE. The first DL transmission grant may include scheduling information for communicating with the serving BS A. The first DL transmission grant may indicate a transmission configuration, for example, including a modulation coding scheme (MCS) and/or a beam direction for the DL communication.

At step 1030, the serving BS A transmits a first signal to the UE according to the first DL transmission grant. The UE may receive the first signal based on the first DL transmission grant, for example, detected during the monitoring.

At step 1040, the serving BS A coordinates a DL communication with the alternate BS B in the active set. The coordination may include determining a transmission configuration (e.g., a MCS and/or a beam direction) for the UE to communicate with the alternate BS B. The coordination may include instructing the alternate BS B to transmit a DL signal to the UE based on the determined transmission configuration. The coordination to switch communication to the alternate BS B may be due to transmit yielding, directional LBT, or a scheduling conflict as described above.

At step 1050, the serving BS A transmits a second PDCCH signal carrying a second DL transmission grant for the UE based on the coordination. The second DL transmission grant may include scheduling information for communicating with the alternate BS B.

At step 1060, the alternate BS B transmits a second signal to the UE according to the second DL transmission grant. The UE may receive the second signal based on the second DL transmission grant, for example, detected during the monitoring.

As described above, a BS may communicate with a UE in the form of radio frames, subframes, slots, and/or mini-slots. In an embodiment, a subframe may include a portion (e.g., one or more OFDM symbols) for transmitting a PDCCH signal and a portion (e.g., one or more OFDM symbols) for transmitting a data signal. The PDCCH signal may carry control information associated with the transmission of the data signal. In such an embodiment, the UE may monitor for PDCCH signals according to timings of radio frames, subframes, slots, and/or mini-slots.

Figure 11:
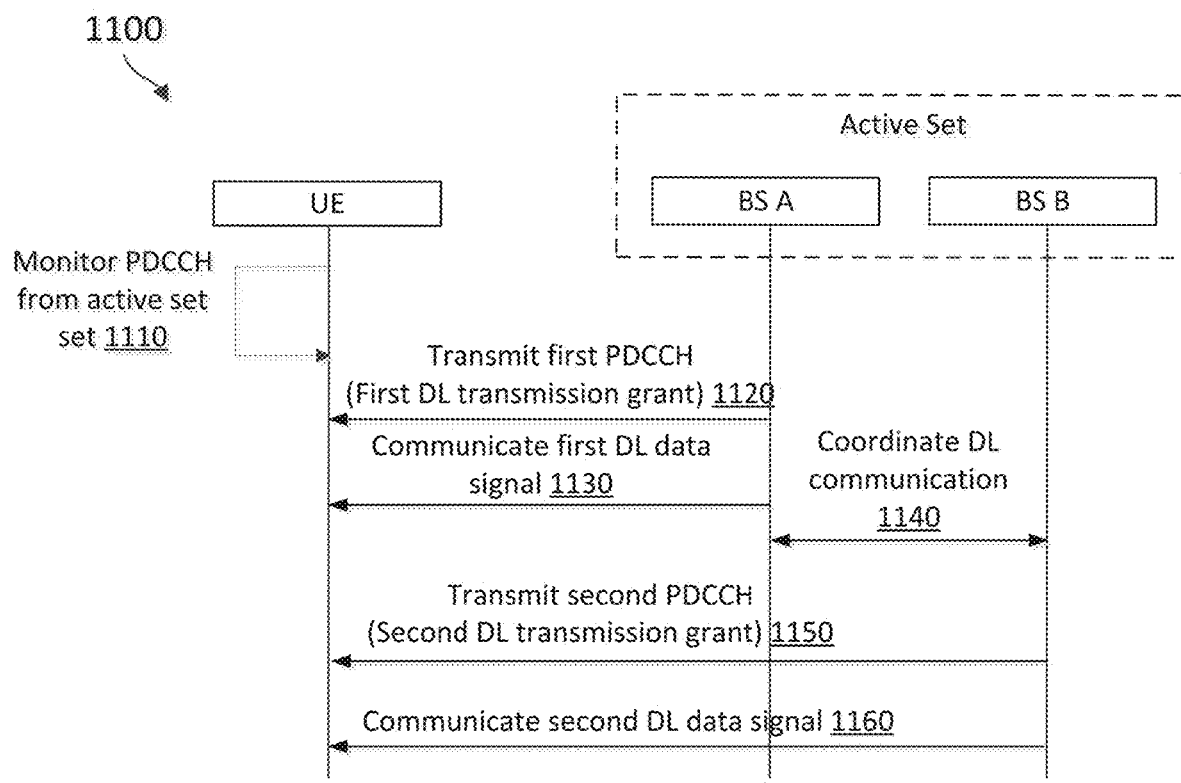
FIG. 11 is a signaling diagram illustrating a DL communication method according to embodiments of the present disclosure.

FIG. 11 is a signaling diagram illustrating a DL communication method 1100 according to embodiments of the present disclosure. The method 1100 illustrates a UE monitoring DL transmission grants from multiple BSs in an active set. Steps of the method 1100 can be executed by computing devices (e.g., a processor, processing circuit, and/or other suitable component) of wireless communication devices, such as the BSs 105, 205, 305, 405, and 600 and the UEs 115, 215, 315, 415, and 500. The method 1100 can be better understood with reference to FIGS. 2, 3, and 4. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the UE monitors for a PDCCH signal from the active set of BSs (e.g., the serving BS A and the alternate BS B).

At step 1120, the serving BS A transmits a first PDCCH signal carrying a first DL transmission grant for the UE.

At step 1130, the serving BS A transmits a first signal to the UE based on the first DL transmission grant. The UE may receive the first signal based on the first DL transmission grant, for example, detected during the monitoring.

At step 1140, the serving BS A coordinates a DL communication with the alternate BS B in the active set. The coordination may include determining a transmission configuration (e.g., a MCS and/or a beam direction) for the UE to communicate with the alternate BS B. The coordination may include instructing the alternate BS B to transmit a transmission grant including the determined transmission configuration to the UE. The coordination to switch communication to the alternate BS B may be due to transmit yielding, directional LBT, or a scheduling conflict as described above.

At step 1150, the alternate BS B transmits a second PDCCH signal carrying a second DL transmission grant for the UE based on the coordination. For example, the second DL transmission grant includes the determined transmission configuration.

At step 1160, the alternate BS B transmits a second signal to the UE based on the second DL transmission grant. The UE may receive the second signal based on the second DL transmission grant, for example, detected during the monitoring.

Figure 12:
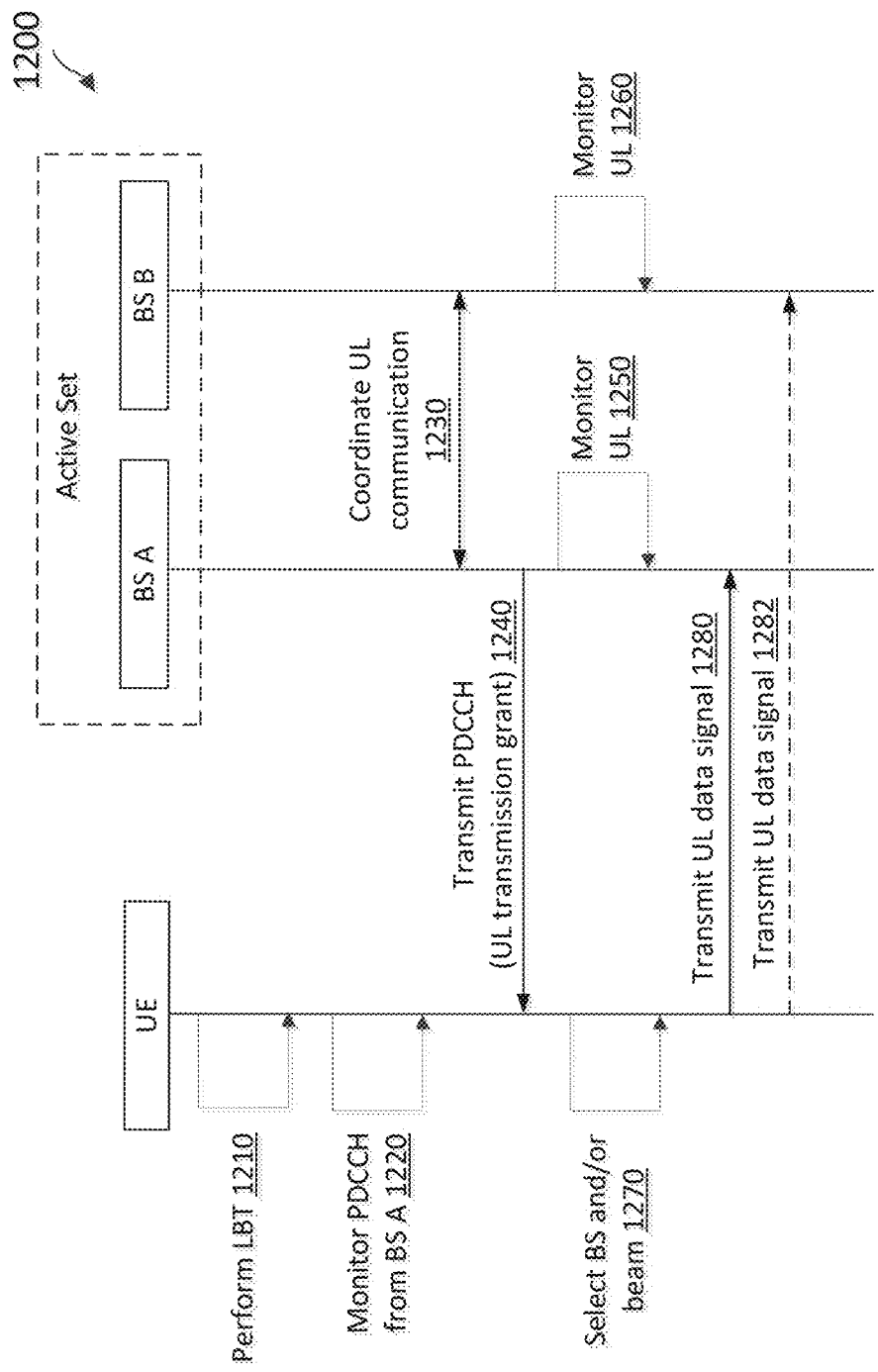
FIG. 12 is a signaling diagram illustrating an uplink (UL) communication method according to embodiments of the present disclosure.

FIG. 12 is a signaling diagram illustrating a UL communication method 1200 according to embodiments of the present disclosure. The method 1200 illustrates a serving BS transmitting DL transmission grants with multiple hypotheses or transmission configurations for DL communications with BSs in an active set. Steps of the method 1200 can be executed by computing devices (e.g., a processor, processing circuit, and/or other suitable component) of wireless communication devices, such as the BSs 105, 205, 305, 405, and 600 and the UEs 115, 215, 315, 415, and 500. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the UE performs LBT (e.g., sensing) in the frequency channel. In some embodiments, the LBT may be a directional LBT.

At step 1220, the UE monitors for a PDCCH signal from the serving BS A.

At step 1230, the serving BS A coordinates a UL communication with the alternate BS B. The coordination may include determining transmission configurations or transmission hypotheses that the UE may use for communicating with the serving BS A or the alternate BS B. The coordination may include instructing the alternate BS B to monitor for UL reception from the UE based on corresponding transmission configurations. Each transmission configuration may include a MCS, one or more beam directions, time-frequency resources, and/or other transmission related parameters. For example, one or more transmission configurations may be used for UL communications with the serving BS A and one or more other transmission configurations may be used for UL communications with the alternate BS B.

At step 1240, the serving BS A transmits a PDCCH signal carrying a UL transmission grant. The UL transmission grant may include the transmission configurations.

At step 1250, the serving BS A may monitor for a UL reception from the UE based on corresponding transmission configurations. Similarly, at step 1260, the alternate BS B may monitor for a UL reception from the UE based on corresponding transmission configurations.

At step 1270, upon receiving the UL transmission grant (e.g., detected during the PDCCH monitoring at the step 1220), the UE may select a target receiving BS and/or one or more beam directions (e.g., a single beam or a subset of beams for beam diversity) from the transmission configurations. For example, the UE may select the serving BS A as the target receiving BS and/or one or more beam directions based on the transmission configurations and the LBT (e.g., the yielding decisions). At step 1280, the UE transmits a UL data signal to the serving BS A using a single selected directional beam or a selected subset of directional beams based on the selection. The serving BS A may receive the UL data signal from the UE based on the monitoring at the step 1250.

Alternatively, at step 1270, the UE may select the alternate BS B as the target receiving BS and one or more beam directions based on the transmission configurations and the LBT. At step 1282, the UE transmits a UL data signal to the alternate BS B using a single selected directional beam or a selected subset of directional beams based on the selection. The alternate BS B may receive the UL data signal from the UE based on the monitoring at the step 1260.

Figure 13:
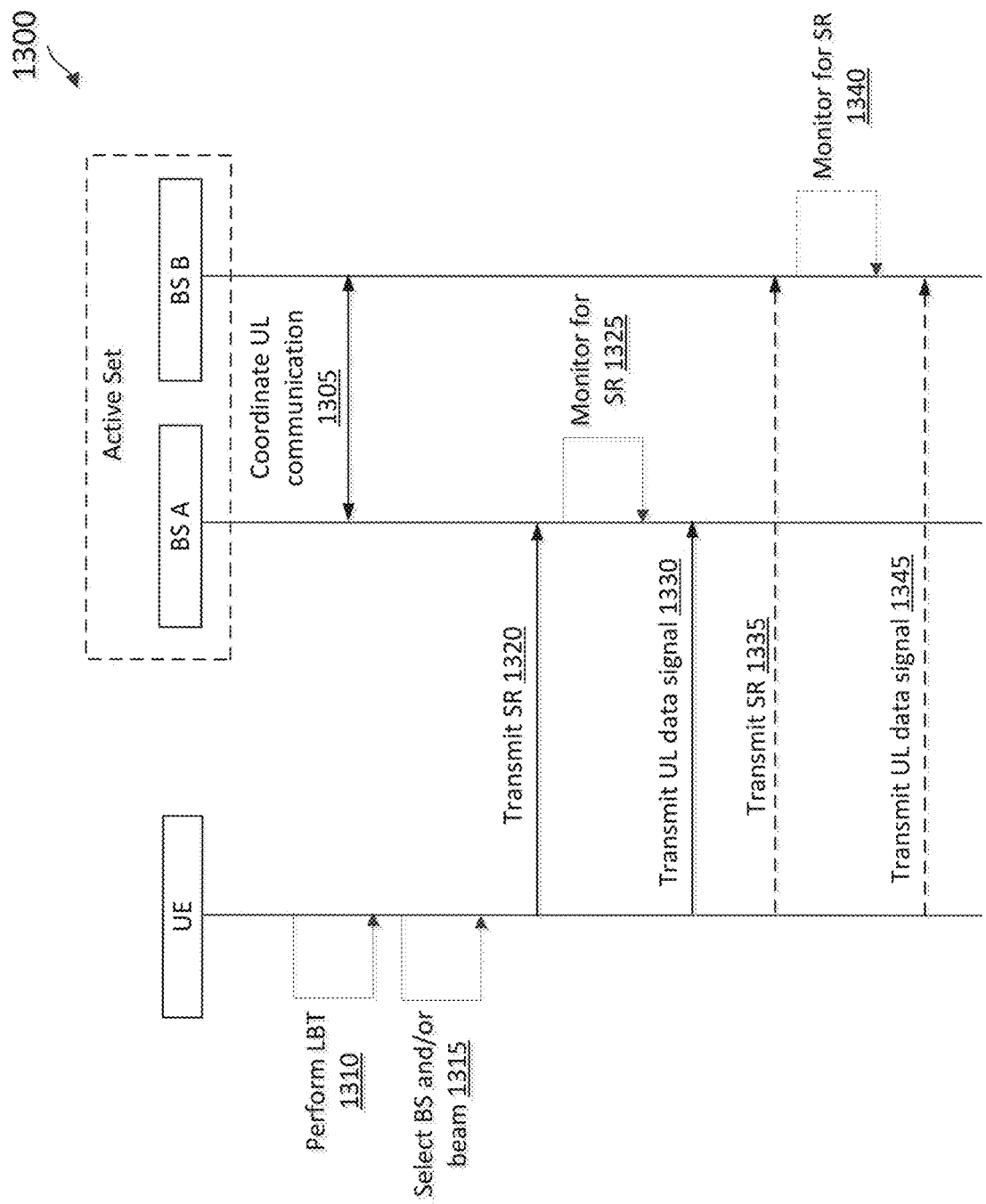
FIG. 13 is a signaling diagram illustrating an UL communication method according to embodiments of the present disclosure.

FIG. 13 is a signaling diagram illustrating a UL communication method 1300 according to embodiments of the present disclosure. The method 1300 illustrates a UE autonomously selecting a target BS from an active set and/or a beam direction for UL communications based on LBT. Steps of the method 1300 can be executed by computing devices (e.g., a processor, processing circuit, and/or other suitable component) of wireless communication devices, such as the BSs 105, 205, 305, 405, and 600 and the UEs 115, 215, 315, 415, and 500. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1305, the serving BS A coordinates UL communications with the alternate BS B. The coordination may include instructing the alternate BS to monitor for SR from the UE and monitor for UL reception from the UE based on detected SRs.

At step 1310, the UE performs LBT (e.g., sensing) in the frequency channel. In some embodiments, the LBT may be a directional LBT.

At step 1315, the UE selects a BS and/or a beam direction for a UL communication based on the LBT. For example, the UE may select the serving BS A as the target BS. At step 1320, the UE transmits a SR to the serving BS A. The SR may indicate a MCS and/or the selected beam direction. At step 1325, the serving BS A monitors for an SR from the UE. At step 1330, the UE transmits a UL data signal to the serving BS A using a single selected directional beam or a selected subset of directional beams based on the selection. The serving BS A may receive the UL data signal based on the received SR.

Alternatively, at step 1315, the UE may select the alternate BS B as the target BS. At step 1335, the UE transmits a SR to the alternate BS B. The SR may indicate a MCS and/or the selected beam direction. At step 1340, the alternate BS B monitors for an SR from the UE. At step 1345, the UE transmits a UL data signal to the alternate BS B using a single selected directional beam or a selected subset of directional beams based on the selection. The alternate BS B may receive the UL data signal based on the received SR.

Figure 14:
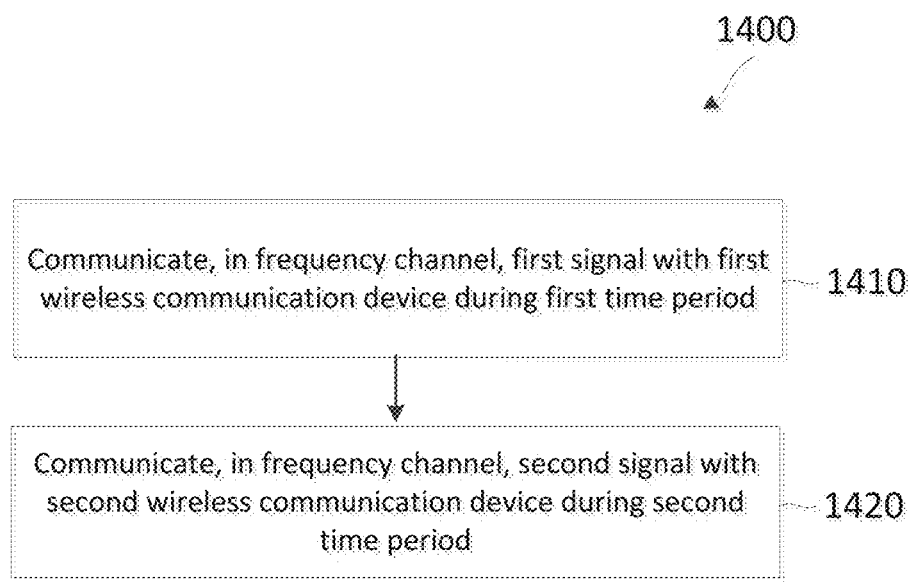
FIG. 14 is a flow diagram of a communication method according to embodiments of the present disclosure.

FIG. 14 is a flow diagram of a communication method 1400 according to embodiments of the present disclosure. Steps of the method 1400 can be executed by a computing device (e.g., a processor, processing circuit, and/or other suitable component) of a wireless communication device, such as the UEs 115, 215, 315, 415, and 500. The method 1400 may employ similar mechanisms as in the methods 700, 800, 900, 1000, 1100, 1200, and 1400 described with respect to FIGS. 7, 8, 9, 10, 11, 12, and 13, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes communicating, by a UE in a frequency channel, a first signal with a first wireless communication device (e.g., the BSs 105, 205, 305, 405, 600) during a first time period (e.g., the time period 702).

At step 1420, the method 1400 includes communicating, by the UE in the frequency channel, a second signal with a second wireless communication device (e.g., the BSs 105, 205, 305, 405, 600) during a second time period (e.g., the time period 704). The communicating the second signal with the second wireless communication device is based on a switch to communicate with the second wireless communication device based on at least an occupancy of the frequency channel. The occupancy may be associated with a reservation or transmit yielding, a dynamic LBT, or a schedule conflict as described above in the scenarios 200, 300, and 400 with respect to FIGS. 2, 3, and 4, respectively.

The first wireless communication device and the second wireless communication device may be associated with an active BS set. The active BS set may include at least the first wireless communication device and the second wireless communication device. For example, the first wireless communication device may be a serving BS and the second wireless communication device may be an alternate BS. Alternatively, the second wireless communication device may be a serving BS and the first wireless communication device may be an alternate BS.

Figure 15:
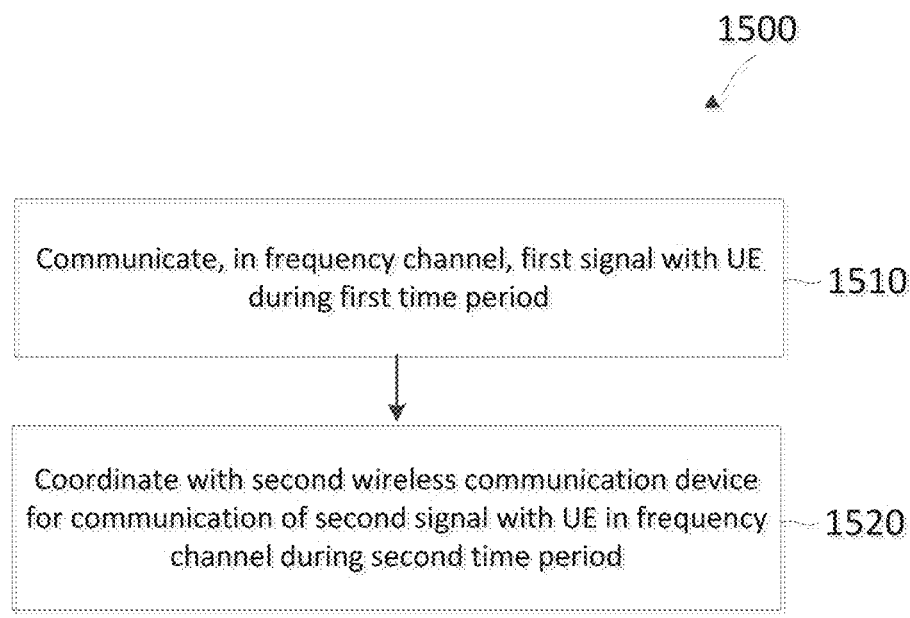
FIG. 15 is a flow diagram of a communication method according to embodiments of the present disclosure.

FIG. 15 is a flow diagram of a communication method 1500 according to embodiments of the present disclosure. Steps of the method 1500 can be executed by a computing device (e.g., a processor, processing circuit, and/or other suitable component) of a wireless communication device, such as the BSs 105, 205, 305, 405, and 600. The method 1500 may employ similar mechanisms as in the methods 700, 800, 900, 1000, 1100, 1200, and 1500 described with respect to FIGS. 7, 8, 9, 10, 11, 12, and 13, respectively. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the method 1500 includes communicating, by a first wireless communication device in a frequency channel, a first signal with a UE (e.g., the UE 115, 215, 315, 415, 500) during a first time period (e.g., the time period 702).

At step 1520, the method 1500 includes coordinating, by the first wireless communication device with a second wireless communication device (e.g., the BSs 105, 205, 305, 405, and 600) for a communication of a second signal with a UE in the frequency channel during a second time period (e.g., the time period 704). The coordinating with the second wireless communication device is based on a switch to coordinate with the second wireless communication device based on at least an occupancy of the frequency channel. The occupancy may be associated with a reservation or transmit yielding, a dynamic LBT, or a schedule conflict as described above in the scenarios 200, 300, and 400 with respect to FIGS. 2, 3, and 4, respectively.

The first wireless communication device and the second wireless communication device may be associated with an active BS set. The active BS set may include at least the first wireless communication device and the second wireless communication device. For example, the first wireless communication device may be a serving BS and the second wireless communication device may be an alternate BS.

Alternatively, the second wireless communication device may be a serving BS and the first wireless communication device may be an alternate BS.

Further embodiments of the disclosure may include a method of wireless communication, comprising communicating, by a user equipment (UE) in a frequency channel, a first signal with a first wireless communication device during a first time period; and communicating, by the UE in the frequency channel, a second signal with a second wireless communication device during a second time period, wherein the communicating the second signal with the second wireless communication device is based on a switch to communicate with the second wireless communication device based on at least an occupancy of the frequency channel, wherein the first wireless communication device and the second wireless communication device are different, and wherein the first time period and the second time period are different.

In some embodiments, the occupancy of the frequency channel is associated with a reservation for the frequency channel in the second time period. In some embodiments, the occupancy of the frequency channel is associated with an expected directional beam transmission of the first wireless communication device in the frequency channel during the second time period. In some embodiments, the occupancy of the frequency channel is associated with an expected communication of the first wireless communication device in the frequency channel during the second time period, the expected communication in a different link direction than the second signal. In some embodiments, the first signal is a control signal carrying control information, and wherein the second signal is a data signal carrying data. In some embodiments, the communicating the first signal includes communicating the first signal in a first link direction, wherein communicating the second signal includes communicating the second signal in a second link direction, and wherein the first link direction and the second link direction are different. In some embodiments, the method further comprises monitoring, by the UE, for a transmission grant from one or more wireless communication devices of a set of wireless communication devices, the set including the first wireless communication device and the second wireless communication device, wherein the communicating the second signal is based on the monitoring. In some embodiments, the method further comprises receiving, by the UE, an uplink transmission grant including one or more transmission configurations associated with a set of wireless communication devices, the set including the first wireless communication device and the second wireless communication device; and sensing, by the UE, the frequency channel based on listen-before-talk (LBT), wherein the communicating the second signal includes transmitting, by the UE to the second wireless communication device, the second signal during the second time period based on the sensing and the uplink transmission grant. In some embodiments, the LBT is a directional LBT. In some embodiments, the one or more transmission configurations indicate one or more beam directions, wherein the method further comprises selecting, by the UE, a beam direction from the one or more beam directions based on the sensing, and wherein the communicating the second signal includes transmitting, by the UE to the second wireless communication device, the second signal in the second time period using the selected beam direction. In some embodiments, the method further comprises sensing, by the UE, the frequency channel based on listen-before-talk (LBT); and transmitting, by the UE to the second wireless communication device, a scheduling request (SR) based on the sensing, wherein the communicating the second signal includes transmitting, by the UE to the second wireless communication device, the second signal during the second time period based on the SR.

Further embodiments of the disclosure may include a method of wireless communication, comprising communicating, by a first wireless communication device in a frequency channel, a first signal with a user equipment (UE) during a first time period; and coordinating, by the first wireless communication device with a second wireless communication device, a communication of a second signal with the UE in the frequency channel during a second time period, wherein the coordinating with the second wireless communication device is based on a switch to coordinate with the second wireless communication device based on at least an occupancy of the frequency channel, wherein the first wireless communication device and the second wireless communication device are different, and wherein the first time period and the second time period are different.

In some embodiments, the method further comprises detecting, by the first wireless communication device, the frequency channel for a reservation from a third wireless communication device to access the frequency channel during the second time period, wherein the occupancy is associated with the detected reservation. In some embodiments, the method further comprises scheduling, by the first wireless communication device, to communicate with another UE during the second time period using a directional beam, wherein the occupancy is associated with the scheduled directional beam. In some embodiments, the method further comprises scheduling, by the first wireless communication device, a communication with another UE during the second time period in a different link direction than the communication of the second signal, wherein the occupancy is associated with the scheduled communication with the another UE. In some embodiments, the first signal is a control signal carrying control information, and wherein the second signal is a data signal carrying data. In some embodiments, the communicating the first signal includes communicating the first signal in a first link direction, wherein the coordinating includes coordinating the communication of the second signal in a second link direction, and wherein the first link direction and the second link direction are different. In some embodiments, the method further comprises transmitting, by the first wireless communication device, a transmission grant based on the occupancy of the frequency channel, the transmission grant including one or more transmission configurations associated with the first wireless communication device and the second wireless communication device, wherein the coordinating is based on the transmission grant. In some embodiments, the method further comprises monitoring, by the first wireless communication device, for a scheduling request (SR) from the UE; and receiving, by the first wireless communication device from the UE, a third signal during a third time period based on at least the SR. In some embodiments, the method further comprises receiving, by the first wireless communication device from a third wireless communication device, an instruction to coordinate communication with another UE during a third time period based on another occupancy of the frequency channel, wherein the instruction includes at least one of a transmission grant transmission or a scheduling request (SR) monitoring; and communicating, by the first wireless communication device in the frequency channel, a third signal with the another UE during the third time period based on the instruction.

Further embodiments of the disclosure may include an apparatus comprising a transceiver configured to communicate, in a frequency channel, a first signal with a first wireless communication device during a first time period; and communicate, in the frequency channel, a second signal with a second wireless communication device during a second time period, wherein the communication of the second signal with the second wireless communication device is based on a switch to communicate with the second wireless communication device based on at least an occupancy of the frequency channel, wherein the first wireless communication device and the second wireless communication device are different, and wherein the first time period and the second time period are different.

In some embodiments, the first signal is a control signal carrying control information, and wherein the second signal is a data signal carrying data. In some embodiments, the transceiver is further configured to communicate the first signal in a first link direction; and communicate the second signal in a second link direction, and wherein the first link direction and the second link direction are different. In some embodiments, the apparatus further comprises a processor configured to monitor for a transmission grant from one or more wireless communication devices of a set of wireless communication devices, the set including the first wireless communication device and the second wireless communication device, wherein the transceiver is further configured to communicate the second signal based on the monitoring. In some embodiments, the apparatus further comprises a processor configured to sense the frequency channel based on listen-before-talk (LBT), wherein the transceiver is further configured to receive an uplink transmission grant including one or more transmission configurations associated with a set of wireless communication devices, the set including the first wireless communication device and the second wireless communication device; and communicate the second signal by transmitting, to the second wireless communication device, the second signal during the second time period based on the sensing and the uplink transmission grant. In some embodiments, the apparatus further comprises a processor configured to sense the frequency channel based on listen-before-talk (LBT), wherein the transceiver is further configured to transmit, to the second wireless communication device, a scheduling request (SR) based on the sensing; and communicate the second signal by transmitting, to the second wireless communication device, the second signal during the second time period based on the SR.

Further embodiments of the disclosure may include an apparatus comprising a transceiver configured to communicate, in a frequency channel, a first signal with a user equipment (UE) during a first time period; and a processor configured to coordinate, with a second wireless communication device, a communication of a second signal with the UE in the frequency channel during a second time period, wherein the coordination with second wireless communication device is based on a switch to coordinate with the second wireless communication device based on at least an occupancy of the frequency channel, wherein the apparatus and the second wireless communication device are different, and wherein the first time period and the second time period are different.

In some embodiments, the first signal is a control signal carrying control information, and wherein the second signal is a data signal carrying data. In some embodiments, the transceiver is further configured to communicate the first signal in a first link direction, wherein the processor is further configured to coordinate, with the second wireless communication device, the communication of the second signal in a second link direction, and wherein the first link direction and the second link direction are different. In some embodiments, the transceiver is further configured to transmit a transmission grant including one or more transmission configurations associated with the apparatus and the second wireless communication device, and wherein the processor is further configured to coordinate, with the second wireless communication device, the communication of the second signal based on the transmission grant. In some embodiments, the processor is further configured to monitor for a scheduling request (SR) from the UE, the SR associated with another occupancy in the frequency channel, and wherein the transceiver is further configured to receive, from the UE, a third signal during a third time period based on at least the SR.

Further embodiments of the disclosure may include a computer-readable medium having program code recorded thereon, the program code comprising code for causing a UE to communicate, in a frequency channel, a first signal with a first wireless communication device during a first time period; and code for causing the UE to communicate, in the frequency channel, a second signal with a second wireless communication device during a second time period, wherein the communicating the second signal with the second wireless communication device is based on a switch to communicate with the second wireless communication device based on at least an occupancy of the frequency channel, wherein the first wireless communication device and the second wireless communication device are different, and wherein the first time period and the second time period are different.

In some embodiments, the occupancy of the frequency channel is associated with a reservation for the frequency channel in the second time period. In some embodiments, the occupancy of the frequency channel is associated with an expected directional beam transmission of the first wireless communication device in the frequency channel during the second time period. In some embodiments, the occupancy of the frequency channel is associated with an expected communication of the first wireless communication device in the frequency channel during the second time period, the expected communication in a different link direction than the second signal. In some embodiments, the first signal is a control signal carrying control information, and wherein the second signal is a data signal carrying data. In some embodiments, the code for causing the UE to communicate the first signal is further configured to communicate the first signal in a first link direction, wherein the code for causing the UE to communicate the second signal is further configured to communicate the second signal in a second link direction, and wherein the first link direction and the second link direction are different. In some embodiments, the program code further comprises code for causing the UE to monitor for a transmission grant from one or more wireless communication devices of a set of wireless communication devices, the set including the first wireless communication device and the second wireless communication device, wherein the code for causing the UE to communicate the second signal based on the monitoring. In some embodiments, the program code further comprises code for causing the UE to receive an uplink transmission grant including one or more transmission configurations associated with a set of wireless communication devices, the set including the first wireless communication device and the second wireless communication device; and code for causing the UE to sense the frequency channel based on listen-before-talk (LBT), wherein the code for causing the UE to communicate the second signal is further configured to transmit, to the second wireless communication device, the second signal during the second time period based on the sensing and the uplink transmission grant. In some embodiments, the LBT is a directional LBT. In some embodiments, the one or more transmission configurations indicate one or more beam directions, wherein the program code further comprises code for causing the UE to select a beam direction from the one or more beam directions based on the sensing, and wherein the code for causing the UE to communicate the second signal is further configured to transmit, to the second wireless communication device, the second signal in the second time period using the selected beam direction. In some embodiments, the program code further comprises code for causing the UE to sense the frequency channel based on listen-before-talk (LBT); and transmitting, by the UE to the second wireless communication device, a scheduling request (SR) based on the sensing, wherein the code for causing the UE to communicate the second signal is further configured to transmit, to the second wireless communication device, the second signal during the second time period based on the SR.

Further embodiments of the disclosure may include a computer-readable medium having program code recorded thereon, the program code comprising code for causing a first wireless communication device to communicate, in a frequency channel, a first signal with a user equipment (UE) during a first time period; and code for causing the first wireless communication device to coordinate, by the first wireless communication device with a second wireless communication device, a communication of a second signal with the UE in the frequency channel during a second time period, wherein the coordinating with the second wireless communication device is based on a switch to coordinate with the second wireless communication device based on at least an occupancy of the frequency channel, wherein the first wireless communication device and the second wireless communication device are different, and wherein the first time period and the second time period are different.

In some embodiments, the program code further comprises code for causing the first wireless communication device to detect the frequency channel for a reservation from a third wireless communication device to access the frequency channel during the second time period, wherein the occupancy is associated with the detected reservation. In some embodiments, the program code further comprises code for causing the first wireless communication device to schedule a communication with another UE during the second time period using a directional beam, wherein the occupancy is associated with the scheduled directional beam. In some embodiments, the program code further comprises code for causing the first wireless communication device to schedule a communication with another UE during the second time period in a different link direction than the communication of the second signal, wherein the occupancy is associated with the scheduled communication with the another UE. In some embodiments, the first signal is a control signal carrying control information, and wherein the second signal is a data signal carrying data. In some embodiments, the code for causing the first wireless communication device to communicate the first signal is further configured to communicate the first signal in a first link direction, wherein the code for causing the first wireless communication device to coordinate the communication is further configured to coordinate the communication of the second signal in a second link direction, and wherein the first link direction and the second link direction are different. In some embodiments, the program code further comprises code for causing the first wireless communication device to transmit a transmission grant based on the occupancy of the frequency channel, the transmission grant including one or more transmission configurations associated with the first wireless communication device and the second wireless communication device, wherein the coordinating is based on the transmission grant. In some embodiments, the program code further comprises code for causing the first wireless communication device to monitor for a scheduling request (SR) from the UE; and code for causing the first wireless communication device to receive, from the UE, a third signal during a third time period based on at least the SR. In some embodiments, the program code further comprises code for causing the first wireless communication device to receive, from a third wireless communication device, an instruction to coordinate communication with another UE during a third time period based on another occupancy of the frequency channel, wherein the instruction includes at least one of a transmission grant transmission or a scheduling request (SR) monitoring; and code for causing the first wireless communication device to communicate, in the frequency channel, a third signal with the another UE during the third time period based on the instruction.

Further embodiments of the disclosure may include an apparatus comprising means for communicating, in a frequency channel, a first signal with a first wireless communication device during a first time period; and means for communicating, in the frequency channel, a second signal with a second wireless communication device during a second time period, wherein the communicating the second signal with the second wireless communication device is based on a switch to communicate with the second wireless communication device based on at least an occupancy of the frequency channel, wherein the first wireless communication device and the second wireless communication device are different, and wherein the first time period and the second time period are different.

In some embodiments, the occupancy of the frequency channel is associated with a reservation for the frequency channel in the second time period. In some embodiments, the occupancy of the frequency channel is associated with an expected directional beam transmission of the first wireless communication device in the frequency channel during the second time period. In some embodiments, the occupancy of the frequency channel is associated with an expected communication of the first wireless communication device in the frequency channel during the second time period, the expected communication in a different link direction than the second signal. In some embodiments, the first signal is a control signal carrying control information, and wherein the second signal is a data signal carrying data. In some embodiments, the means for communicating the first signal is further configured to communicate the first signal in a first link direction, wherein means for communicating the second signal is further configured to communicate the second signal in a second link direction, and wherein the first link direction and the second link direction are different. In some embodiments, the apparatus further comprises means for monitoring for a transmission grant from one or more wireless communication devices of a set of wireless communication devices, the set including the first wireless communication device and the second wireless communication device, wherein the means for communicating the second signal is further configured to communicate the second signal based on the monitoring. In some embodiments, the apparatus further comprises means for receiving an uplink transmission grant including one or more transmission configurations associated with a set of wireless communication devices, the set including the first wireless communication device and the second wireless communication device; and means for sensing the frequency channel based on listen-before-talk (LBT), wherein the means for communicating the second signal is further configured to transmit, to the second wireless communication device, the second signal during the second time period based on the sensing and the uplink transmission grant. In some embodiments, the LBT is a directional LBT. In some embodiments, the one or more transmission configurations indicate one or more beam directions, wherein the apparatus further comprises means for selecting a beam direction from the one or more beam directions based on the sensing, and wherein the means for communicating the second signal is further configured to transmit to the second wireless communication device, the second signal in the second time period using the selected beam direction. In some embodiments, the apparatus further comprises means for sensing the frequency channel based on listen-before-talk (LBT); and means for transmitting, to the second wireless communication device, a scheduling request (SR) based on the sensing, wherein the means for communicating the second signal is further configured to transmit, to the second wireless communication device, the second signal during the second time period based on the SR.

Further embodiments of the disclosure may include an apparatus comprising means for communicating, in a frequency channel, a first signal with a user equipment (UE) during a first time period; and means for coordinating, with a second wireless communication device, a communication of a second signal with the UE in the frequency channel during a second time period, wherein the coordinating with the second wireless communication device is based on a switch to coordinate with the second wireless communication device based on at least an occupancy of the frequency channel, wherein the first wireless communication device and the second wireless communication device are different, and wherein the first time period and the second time period are different.

In some embodiments, the apparatus further comprises means for detecting a reservation from a third wireless communication device to access the frequency channel during the second time period, wherein the occupancy is associated with the detected reservation. In some embodiments, the apparatus further comprises means for scheduling a communication with another UE during the second time period using a directional beam, wherein the occupancy is associated with the scheduled directional beam. In some embodiments, the apparatus further comprises means for scheduling a communication with another UE during the second time period in a different link direction than the communication of the second signal, wherein the occupancy is associated with the scheduled communication with the another UE. In some embodiments, the first signal is a control signal carrying control information, and wherein the second signal is a data signal carrying data. In some embodiments, the means for communicating the first signal is further configured to communicate the first signal in a first link direction, wherein the means for coordinating the communication of the second signal is further configured to coordinate the communication of the second signal in a second link direction, and wherein the first link direction and the second link direction are different. In some embodiments, the apparatus further comprises means for transmitting a transmission grant based on the occupancy of the frequency channel, the transmission grant including one or more transmission configurations associated with the first wireless communication device and the second wireless communication device, wherein the means for coordinating is configured to coordinate based on the transmission grant. In some embodiments, the apparatus further comprises means for monitoring for a scheduling request (SR) from the UE; and means for receiving a third signal during a third time period based on at least the SR. In some embodiments, the apparatus further comprises means for receiving, from a third wireless communication device, an instruction to coordinate communication with another UE during a third time period based on another occupancy of the frequency channel, wherein the instruction includes at least one of a transmission grant transmission or a scheduling request (SR) monitoring; and means for communicating, in the frequency channel, a third signal with the another UE during the third time period based on the instruction.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a user equipment (UE) in a first frequency channel, a first signal with a first wireless communication device during a first time period, the first signal including a transmission grant for the UE to select between the first wireless communication device or a second wireless communication device for communicating a second signal in the first frequency channel during a second time period;
selecting, by the UE in response to the transmission grant, the first wireless communication device or the second wireless communication device for communicating the second signal during the second time period based on at least an occupancy of the first frequency channel irrespective of a signal strength of the first wireless communication device; and
communicating, by the UE in the first frequency channel, the second signal with the second wireless communication device during the second time period based on the selecting.

2. The method of claim 1, wherein the occupancy of the first frequency channel is associated with a reservation for the first frequency channel in the second time period.

3. The method of claim 1, wherein the occupancy of the first frequency channel is associated with an expected directional beam transmission of the first wireless communication device in the first frequency channel during the second time period.

4. The method of claim 1, wherein the occupancy of the first frequency channel is associated with an expected communication of the first wireless communication device in the first frequency channel during the second time period, the expected communication in a different link direction than the second signal.

5. The method of claim 1, wherein the first signal is a control signal carrying control information including the transmission grant, and wherein the second signal is a data signal carrying data.

6. The method of claim 1, wherein the communicating the first signal includes communicating the first signal in a first link direction, wherein the communicating the second signal includes communicating the second signal in a second link direction, and wherein the first link direction and the second link direction are different.

7. The method of claim 1, further comprising monitoring, by the UE, for the transmission grant from one or more wireless communication devices of a set of wireless communication devices, the set including the first wireless communication device and the second wireless communication device, wherein the communicating the second signal is based on the monitoring.

8. The method of claim 1, further comprising:
sensing, by the UE, the first frequency channel based on listen-before-talk (LBT),
wherein the transmission grant includes one or more transmission configurations associated with the first wireless communication device and the second wireless communication device, and
wherein the communicating the second signal includes transmitting, by the UE to the second wireless communication device, the second signal during the second time period based on the sensing and the transmission grant.

9. The method of claim 8, wherein the one or more transmission configurations indicate one or more first beam directions for the UE to communicate with the first wireless communication device and one or more second beam directions for the UE to communicate with the second wireless communication device, wherein the selecting includes selecting, by the UE, a beam direction from the one or more first beam directions and the one or more second beam directions based on the sensing, and wherein the communicating the second signal includes transmitting, by the UE to the second wireless communication device, the second signal in the second time period using the selected beam direction.

10. A method of wireless communication, comprising:
communicating, by a first wireless communication device in a first frequency channel, a first signal with a user equipment (UE) during a first time period;
determining, by the first wireless communication device, an occupancy of the first frequency channel; and
coordinating, by the first wireless communication device with a second wireless communication device, a communication of a second signal with the UE in the first frequency channel during a second time period,
wherein the coordinating with the second wireless communication device is based on a switch to coordinate with the second wireless communication device based on at least the determined occupancy of the first frequency channel irrespective of a signal strength of the first wireless communication device.

11. The method of claim 10, further comprising detecting, by the first wireless communication device, a reservation from a third wireless communication device to access the first frequency channel during the second time period, wherein the occupancy is associated with the detected reservation.

12. The method of claim 10, further comprising scheduling, by the first wireless communication device, a communication with another UE during the second time period using a directional beam, wherein the occupancy is associated with the scheduled directional beam.

13. The method of claim 10, further comprising scheduling, by the first wireless communication device, a communication with another UE during the second time period in a different link direction than the communication of the second signal, wherein the occupancy is associated with the scheduled communication with the another UE.

14. The method of claim 10, wherein the first signal is a control signal carrying control information, and wherein the second signal is a data signal carrying data.

15. The method of claim 10, wherein the communicating the first signal includes communicating the first signal in a first link direction, wherein the coordinating includes coordinating the communication of the second signal in a second link direction, and wherein the first link direction and the second link direction are different.

16. The method of claim 10, further comprising transmitting, by the first wireless communication device, a transmission grant based on the occupancy of the first frequency channel, the transmission grant including one or more transmission configurations associated with the first wireless communication device and the second wireless communication device, wherein the coordinating is based on the transmission grant.

17. The method of claim 10, further comprising:
monitoring, by the first wireless communication device, for a scheduling request (SR) from the UE; and
receiving, by the first wireless communication device from the UE, a third signal during a third time period based on at least the SR.

18. The method of claim 10, further comprising:
receiving, by the first wireless communication device from a third wireless communication device, an instruction to coordinate communication with another UE during a third time period based on another occupancy of the first frequency channel, wherein the instruction includes at least one of a transmission grant transmission or a scheduling request (SR) monitoring; and
communicating, by the first wireless communication device in the first frequency channel, a third signal with the another UE during the third time period based on the instruction.

19. An apparatus comprising:
a transceiver configured to:
receive, in a first frequency channel, a first signal with a first wireless communication device during a first time period, the first signal including a transmission grant for the apparatus to select between the first wireless communication device or a second wireless communication for communicating a second signal in the first frequency channel during a second time period;
select, in response to the transmission grant, the first wireless communication device or the second wireless communication device for communicating the second signal during the second time period based on at least an occupancy of the first frequency channel irrespective of a signal strength of the first wireless communication device; and
communicate, in the first frequency channel, the second signal with the second wireless communication device during the second time period based on the selection.

20. The apparatus of claim 19, wherein the first signal is a control signal carrying control information including the transmission grant, and wherein the second signal is a data signal carrying data.

21. The apparatus of claim 19, wherein the transceiver is further configured to:
communicate the first signal in a first link direction; and
communicate the second signal in a second link direction, and wherein the first link direction and the second link direction are different.

22. The apparatus of claim 19, further comprising a processor configured to monitor for the transmission grant from one or more wireless communication devices of a set of wireless communication devices, the set including the first wireless communication device and the second wireless communication device, wherein the transceiver is further configured to communicate the second signal based on the monitoring.

23. The apparatus of claim 19, further comprising a processor configured to sense the first frequency channel based on listen-before-talk (LBT), wherein the transceiver is further configured to:
communicate the second signal by transmitting, to the second wireless communication device, the second signal during the second time period based on the sensing and the transmission grant.

24. An apparatus comprising:
a transceiver configured to communicate, in a first frequency channel, a first signal with a user equipment (UE) during a first time period; and
a processor configured to:
determine an occupancy of the first frequency channel; and
coordinate, with a second wireless communication device, a communication of a second signal with the UE in the first frequency channel during a second time period,
wherein the coordination with the second wireless communication device is based on a switch to coordinate with the second wireless communication device based on at least the determined occupancy of the first frequency channel irrespective of a signal strength of the apparatus,
wherein the apparatus and the second wireless communication device are different, and
wherein the first time period and the second time period are different.

25. The apparatus of claim 24, wherein the first signal is a control signal carrying control information, and wherein the second signal is a data signal carrying data.

26. The apparatus of claim 24, wherein the transceiver is further configured to communicate the first signal in a first link direction, wherein the processor is further configured to coordinate, with the second wireless communication device, the communication of the second signal in a second link direction, and wherein the first link direction and the second link direction are different.

27. The apparatus of claim 24, wherein the transceiver is further configured to transmit a transmission grant including one or more transmission configurations associated with the apparatus and the second wireless communication device, and wherein the processor is further configured to coordinate, with the second wireless communication device, the communication of the second signal based on the transmission grant.

28. The apparatus of claim 24, wherein the processor is further configured to monitor for a scheduling request (SR) from the UE, the SR associated with another occupancy in the first frequency channel, and wherein the transceiver is further configured to receive, from the UE, a third signal during a third time period based on at least the SR.

* * * * *